United States Patent
Schmidt

(10) Patent No.: US 7,366,542 B2
(45) Date of Patent: Apr. 29, 2008

(54) WIRELESS SECURITY

(75) Inventor: Dominik J. Schmidt, Palo Alto, CA (US)

(73) Assignee: Gallitzin Allegheny LLC, Los Altos, CA (US)

( * ) Notice: Subject to any disclaimer, the term of this patent is extended or adjusted under 35 U.S.C. 154(b) by 433 days.

(21) Appl. No.: 10/690,265

(22) Filed: Oct. 21, 2003

(65) Prior Publication Data

US 2005/0094592 A1 May 5, 2005

(51) Int. Cl.
*H04B 1/38* (2006.01)
*H04B 7/00* (2006.01)
*H04J 3/00* (2006.01)
*H04L 9/00* (2006.01)

(52) U.S. Cl. ............... 455/558; 455/41.2; 455/458; 370/336; 713/186

(58) Field of Classification Search ......... 455/558, 455/41.2, 458, 411, 525, 435.1, 502, 552.1, 455/410; 701/209; 320/115, 337, 466; 705/40; 370/336, 337, 466; 713/202

See application file for complete search history.

(56) References Cited

U.S. PATENT DOCUMENTS

| | | | |
|---|---|---|---|
| 5,625,877 A | 4/1997 | Dunn et al. ............. 455/454 |
| 5,933,773 A * | 8/1999 | Barvesten ............. 455/411 |
| 5,956,633 A * | 9/1999 | Janhila ............. 455/410 |
| 5,960,354 A | 9/1999 | Einola ............. 455/454 |
| 6,026,082 A * | 2/2000 | Astrin ............. 370/336 |
| 6,055,442 A * | 4/2000 | Dietrich ............. 455/558 |
| 6,081,168 A | 6/2000 | Park ............. 331/179 |
| 6,240,079 B1 * | 5/2001 | Hamalainen et al. ....... 370/337 |
| 6,374,112 B1 | 4/2002 | Widegren et al. ........ 455/452.2 |
| 6,377,608 B1 | 4/2002 | Zyren ............. 375/132 |
| 6,430,395 B2 | 8/2002 | Arazi et al. ............. 455/41.2 |
| 6,452,910 B1 | 9/2002 | Vij et al. ............. 370/310 |
| 6,563,910 B2 | 5/2003 | Menard et al. ............. 379/45 |
| 6,600,726 B1 | 7/2003 | Nevo et al. ............. 370/278 |
| 6,611,692 B2 * | 8/2003 | Raffel et al. ............. 320/115 |
| 6,636,737 B1 * | 10/2003 | Hills et al. ............. 455/450 |
| 6,690,950 B2 * | 2/2004 | Takagi et al. ............. 455/558 |
| 6,745,018 B1 | 6/2004 | Zehavi et al. ............. 455/296 |
| 6,792,284 B1 * | 9/2004 | Dalsgaard et al. ......... 455/525 |
| 6,804,517 B1 * | 10/2004 | Laurila ............. 455/435.1 |
| 6,826,387 B1 | 11/2004 | Kammer ............. 455/41.2 |
| 6,993,358 B2 * | 1/2006 | Shiotsu et al. ......... 455/552.1 |
| 7,058,040 B2 * | 6/2006 | Schmidt ............. 370/337 |
| 2001/0010689 A1 | 8/2001 | Awater et al. ............. 370/344 |
| 2002/0028655 A1 | 3/2002 | Rosener et al. ............. 455/16 |
| 2002/0061031 A1 * | 5/2002 | Sugar et al. ............. 370/466 |
| 2002/0068570 A1 | 6/2002 | Abrol et al. ............. 455/438 |
| 2002/0128037 A1 | 9/2002 | Schmidt ............. 455/553.1 |
| 2002/0183078 A1 * | 12/2002 | Hase ............. 455/458 |
| 2002/0197998 A1 | 12/2002 | Schmidt ............. 455/452 |
| 2003/0035388 A1 | 2/2003 | Schmidt ............. 370/329 |
| 2003/0058830 A1 | 3/2003 | Schmidt ............. 370/347 |
| 2003/0125073 A1 * | 7/2003 | Tsai et al. ............. 455/552 |
| 2003/0144793 A1 * | 7/2003 | Melaku et al. ............. 701/209 |
| 2004/0014423 A1 * | 1/2004 | Croome et al. ............. 455/41.2 |
| 2005/0102230 A1 * | 5/2005 | Haidar ............. 705/40 |

\* cited by examiner

*Primary Examiner*—Joseph Feild
*Assistant Examiner*—Kiet Doan

(57) ABSTRACT

Apparatus and method for securing a wireless communication medium are disclosed. The apparatus uses a Subscriber Identity Module (SIM) card. The method includes determining a SIM card insertion and if so, accessing SIM data and transmitting the SIM data to a base station for comparison with a local copy of authorized user data file; granting mobile unit access to base station if the information matches and otherwise indicating an access failure.

8 Claims, 4 Drawing Sheets

| | | | |
|---|---|---|---|
| BTS | Base transceiver station | MS | Mobile station |
| BSC | Base station controller | HLR | Home location register |
| BSS | Base station subsystem (BTS+BSC) | VLR | Visited location register |
| MSC | Mobile switching center | EIR | Equipment identity register |
| GMSC | Gateway MSC | AUC | Authentication center |

WIRELESS SECURITY

BACKGROUND

The invention relates to providing wireless security.

The development of mobile radio communications technology has made the world more accessible. The first generation of mobile phone systems (analogue systems like TACS in the UK and AMPS in the USA) were designed without paying much attention to security. Thus they are susceptible to a number of security breaches, including eavesdropping by using low cost scanners and cloning of terminal identities (impersonation). Although limited securities were employed in the enhanced standards, they are difficult to manage. User authentication and frequency hopping (changing of communication frequency) are used to improve security. Modern digital mobile phone systems such as GSM developed various methods for security enhancement, including the use of a smart card called a Subscriber Identity Module (SIM) and the use of cryptography.

When a mobile station (cellular phone) tries to establish a new call, it is required to provide its Temporary Mobile Subscriber Identity (TMSI). TMSI is different for every new call and is uniquely matched to an International Mobile Subscriber Identity (IMSI), which is always the same for a given subscriber. A Visitor Location Register (VLR), a data base which contains subscription information and current locations of its subscribers, sends the IMSI to the Authentication Centre. A random number is generated and is used with the identification key as inputs to an encryption algorithm which then gives an output. The same random number is sent to the mobile station which contains the same encryption algorithm. If the identification key stored in SIM is the same as the one in the Authentication Centre, they should produce the same output. The VLR then compares the outputs and establish the subscriber's identity. The same mechanism is employed to obtain a traffic encryption key which is then used to bulk encrypt all communication traffic. All the signals within the network are encrypted and the identification key is never transmitted through the air to ensure network and data security.

The identification key stored in the SIM is never transmitted through the air interface. Thus it is much more difficult to obtain the key. Party Anonymity is maintained—IMSI is replaced by TMSI which is different for every call. Thus it is extremely difficult to find out a mobile station's identity. Location Confidentiality is maintained due to party anonymity and that only VLR and the mobile station know its location. Fraud detection can be achieved by using some inherent properties of the mobile phone network. If two cellular phones which have the same TMSI are activated at the same time, an impersonation is taking place. If a cellular phone is detected to be switched off at one area and reactivated at another place in an unreasonably short time, impersonation can be also be deduced. For example, if a mobile phone is detected to switch off in one city and reactivated in another city within minutes of each other, one can easily deduce two handsets with the same TMSI are in use. The operators can then be alerted and appropriate actions may be taken.

SUMMARY

In one aspect, a method for securing a wireless communication medium using a Subscriber Identity Module (SIM) card includes determining a SIM card insertion and if so, accessing SIM data and transmitting the SIM data to a base station for comparison with a local copy of authorized user data file; granting mobile unit access to base station if the information matches and otherwise indicating an access failure.

In a second aspect, a method for data transmission over first and second media that overlaps in frequency, includes securing accessing using a SIM card; selecting one of the first and second media as a common medium; and routing the data transmission through the common medium.

Advantages of the invention may include one or more of the following. The system protects the privacy of confidential records and controls user access to a base station. The system also provides base station password protection that prevents unauthorized users from performing server administration tasks and functions. Applications can be restricted in terms of which functions they can perform on the server by the profile of the user logged on to the system. The server also defines a finite number of logons to prevent hacking. This security mechanism approach is well accepted in the traditional client/server world, and will accomplish the security expectations of "Controlled" environments or single issuer projects. The feature in combination with the appropriate client authentication using public and private key encryption and certificates makes it virtually impossible to break the security of the network.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION

Figure 1:
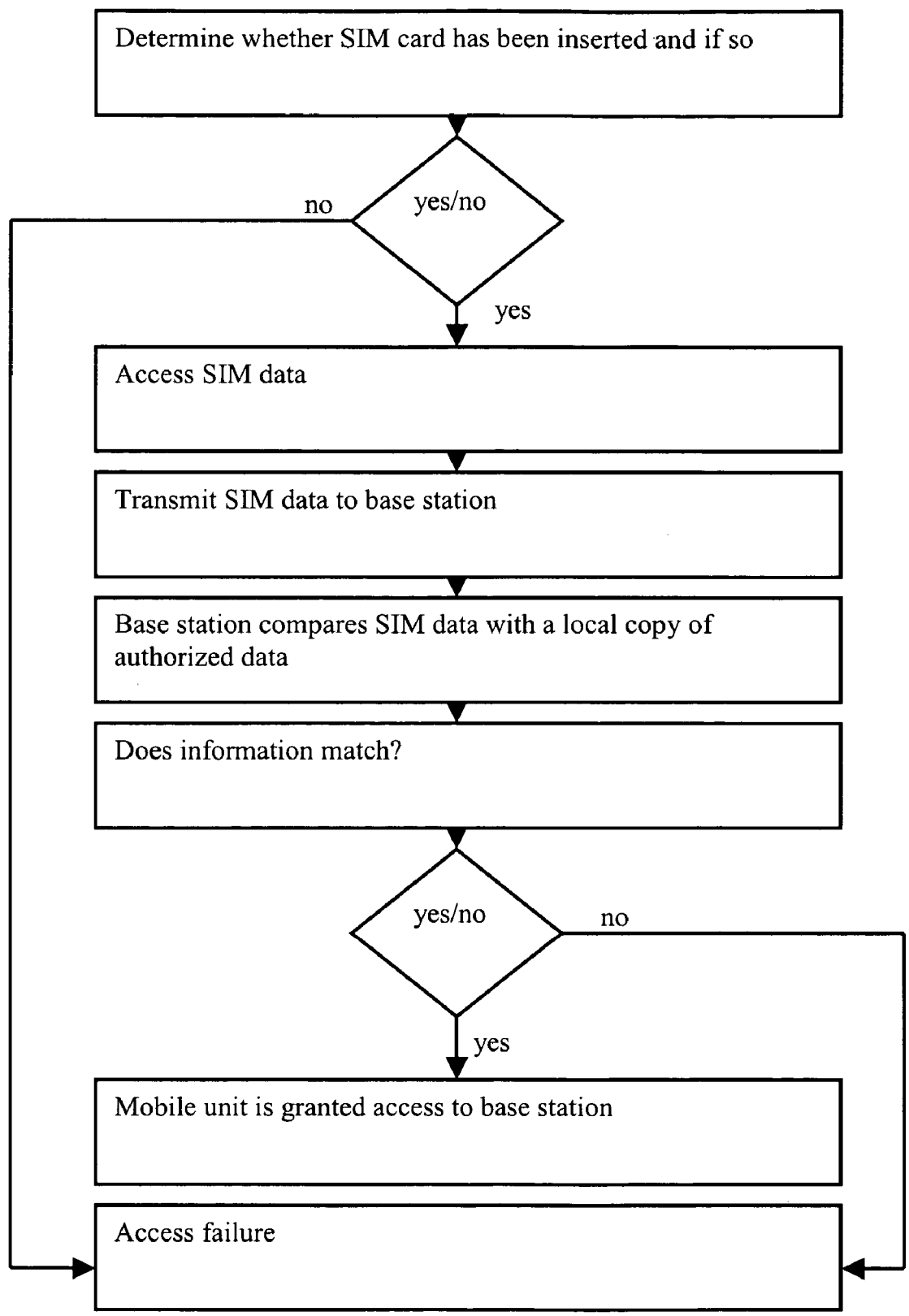
FIG. 1 shows a chart with pseudo-code to provide SIM security.

FIG. 1 shows an exemplary pseudo-code executed by a process to secure a wireless system. The process first determines whether a SIM card has been inserted into a computer system. If the SIM card is not available, the process indicates an access failure. Alternatively, if the SIM card is available, the process accesses SIM data and transmits the SIM data to base station. The base station compares SIM data with a local copy of authorized user data file. If information matches, then grant mobile unit access to base station and otherwise the process indicates an access failure.

Figure 2A:
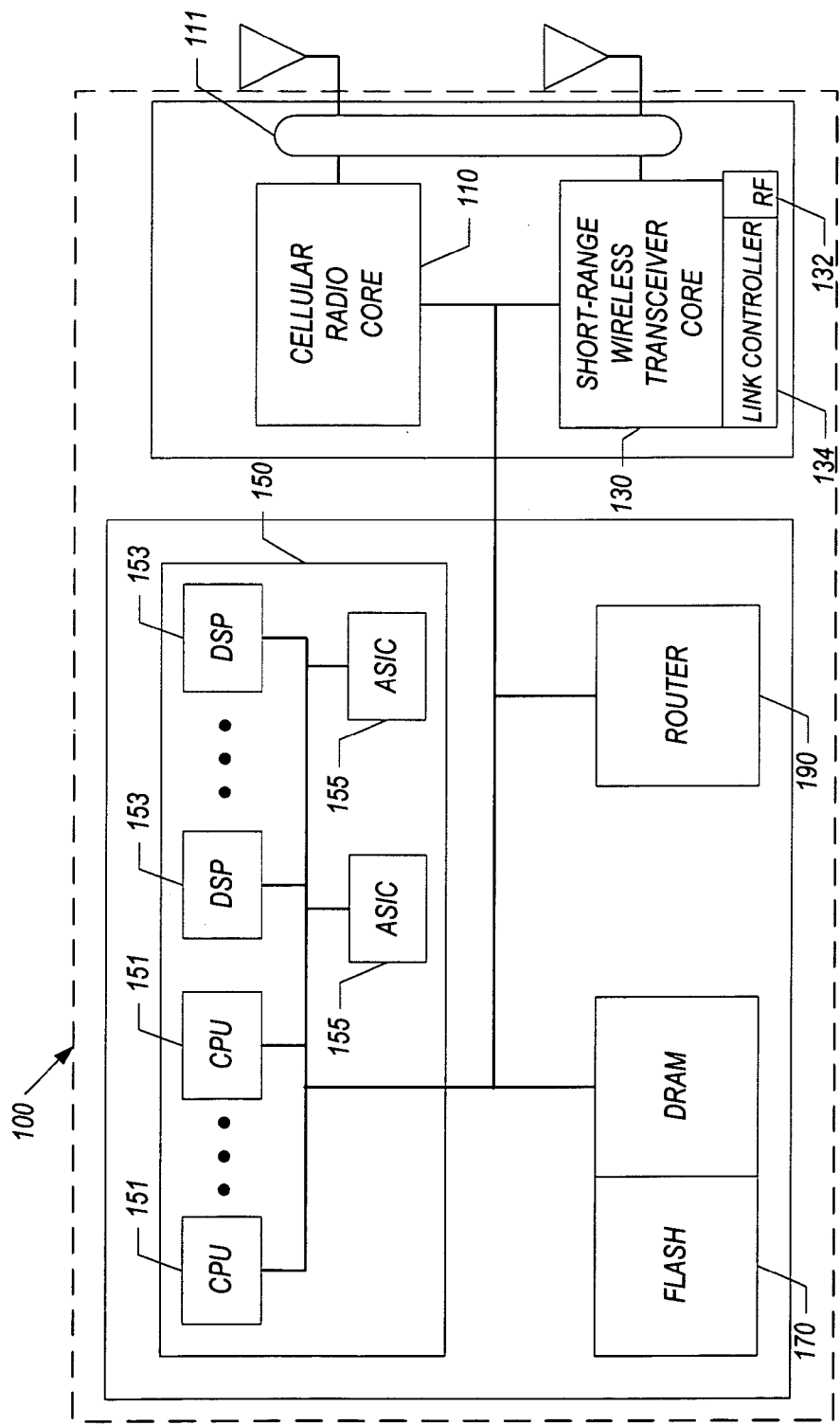
FIG. 2A shows a block diagram of a multi-mode wireless communicator device fabricated on a single silicon integrated chip.

FIG. 2A shows a block diagram of a multi-mode wireless communicator device 100 fabricated on a single silicon integrated chip. In one implementation, the device 100 is an integrated CMOS device with radio frequency (RF) circuits, including a cellular radio core 110, a plurality of short-range wireless transceiver cores 130 that can include Bluetooth cores and 802.11 cores, and a sniffer 111, along side digital circuits, including a reconfigurable processor core 150, a high-density memory array core 170, and a router 190. The high-density memory array core 170 can include various memory technologies such as flash memory and dynamic random access memory (DRAM), among others, on different portions of the memory array core.

The reconfigurable processor core 150 can include one or more processors 151 such as MIPS processors and/or one or more digital signal processor (DSPs) 153, among others. The reconfigurable processor core 150 has a bank of efficient processors 151 and a bank of DSPs 153 with embedded functions. These processors 151 and 153 can be configured to operate optimally on specific problems and can include buffers on the receiving end and buffers on the transmitting end. For example, the bank of DSPs 153 can be optimized to handle discrete cosine transforms (DCTs) or Viterbi encodings, among others. Additionally, dedicated hardware 155 can be provided to handle specific algorithms in silicon more efficiently than programmable processors 151 and 153. The number of active processors is controlled depending on the application, so that power is not used when it is not needed. This embodiment does not rely on complex clock control methods to conserve power, since the individual clocks are not run at high speed, but rather the unused processor is simply turned off when not needed.

Through the router 190, the multi-mode wireless communicator device 100 can detect and communicate with any wireless system it encounters at a given frequency. The router 190 performs the switch in real time through an engine that keeps track of the addresses of where the packets are going. The router 190 can send packets in parallel through two or more separate pathways. For example, if a Bluetooth™ connection is established, the router 190 knows which address it is looking at and will be able to immediately route packets using another connection standard. In doing this operation, the router 190 working with the RF sniffer 111 periodically scans its radio environment ('ping') to decide on optimal transmission medium. The router 190 can send some packets in parallel through both the primary and secondary communication channel to make sure some of the packets arrive at their destinations.

The reconfigurable processor core 150 controls the cellular radio core 110 and the short-range wireless transceiver cores 130 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cell phone core 110 provides wide area network (WAN) access, while the short-range wireless transceiver cores 130 support local area network (LAN) access. The reconfigurable processor core 150 has embedded read-only-memory (ROM) containing software such as IEEE802.11, GSM, GPRS, Edge, and/or Bluetooth™ protocol software, among others.

In one embodiment, the cellular radio core 110 includes a transmitter/receiver section that is connected to an off-chip antenna (not shown). The transmitter/receiver section is a direct conversion radio that includes an I/Q demodulator, transmit/receive oscillator/clock generator, multi-band power amplifier (PA) and PA control circuit, and voltage-controlled oscillators and synthesizers. In another embodiment of transmitter/receiver section 112, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

For voice reception, the combined signals are processed by the processor core 150 to form PCM voice samples that are subsequently converted into an analog signal and provided to an external speaker or earphone. For data reception, the processor simply transfers the data over an input/output (I/O) port. During voice transmission, an off-chip microphone captures analog voice signals, digitizes the signal, and provides the digitized signal to the processor core 150. The processor core 150 codes the signal and reduces the bit-rate for transmission. The processor core 150 converts the reduced bit-rate signals to modulated signals such as I,I,Q,Q modulating signals, for example. During data transmission, the data is modulated and the modulated signals are then fed to the cellular telephone transmitter of the transmitter/receiver section.

Turning now to the short-range wireless transceiver core 130, the short-range wireless transceiver core 130 contains a radio frequency (RF) modem core 132 that communicates with a link controller core 134. The processor core 150 controls the link controller core 134. In one embodiment, the RF modem core 132 has a direct-conversion radio architecture with integrated VCO and frequency synthesizer. The RF-unit 132 includes an RF receiver connected to an analog-digital converter (ADC), which in turn is connected to a modem 116 performing digital modulation, channel filtering, AFC, symbol timing recovery, and bit slicing operations. For transmission, the modem is connected to a digital to analog converter (DAC) that in turn drives an RF transmitter.

The link controller core 134 provides link control function and can be implemented in hardware or in firmware. One embodiment of the core 134 is compliant with the Bluetooth™ specification and processes Bluetooth™ packet types. For header creation, the link controller core 134 performs a header error check, scrambles the header to randomize the data and to minimize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header.

In one exemplary operating sequence, a user is in his or her office and browses a web site on a portable computer through a wired local area network cable such as an Ethernet cable. Then the user walks to a nearby cubicle. As the user disconnects, the device 100 initiates a short-range connection using a Bluetooth™ connection. When the user drives from his or her office to an off-site meeting, the Bluetooth™ connection is replaced with cellular telephone connection. Thus, the device 100 enables easy synchronization and mobility during a cordless connection, and open up possibilities for establishing quick, temporary (ad-hoc) connections with colleagues, friends, or office networks. Appliances using the device 100 are easy to use since they can be set to automatically find and contact each other when within range.

When the multi-mode wireless communicator device 100 is in the cellular telephone connection mode, the short-range wireless transceiver cores 130 are powered down to save power. Unused sections of the chip are also powered down to save power. Many other battery-power saving features are incorporated, and in particular, the cellular radio core 110 when in the standby mode can be powered down for most of the time and only wake up at predetermined instances to read messages transmitted by cellular telephone base stations in the radio's allocated paging time slot.

When the user arrives at the destination, according to one implementation, the cellular radio core 110 uses idle time between its waking periods to activate the short-range wireless transceiver cores 130 to search for a Bluetooth™ channel or an 802.11 signal, for example. If Bluetooth™ signals are detected, the phone sends a deregistration message to the cellular system and/or a registration message to the Bluetooth™ system. Upon deregistration from the cellular system, the cellular radio core 110 is turned off or put into a deep sleep mode with periodic pinging and the short-range wireless transceiver core 130 and relevant parts of the synthesizer are powered up to listen to the Bluetooth™ or the 802.11 channel.

According to one implementation, when the short-range wireless core 130 in the idle mode detects that the short-range signals such as the 802.11 and/or Bluetooth™ signals have dropped in strength, the device 100 activates the cellular radio core 110 to establish a cellular link, using information from the latest periodic ping. If a cellular connection is established and 802.11 and/or Bluetooth™ signals are weak, the device 100 sends a deregistration message to the 802.11 and/or Bluetooth™ system and/or a registration message to the cellular system. Upon registration from the cellular system, the short-range transceiver cores 130 is turned off or put into a deep sleep mode and the cellular radio core 110 and relevant parts of the synthesizer are powered up to listen to the cellular channel.

The router 190 can send packets in parallel through the separate pathways of cellular or 802.11 and/or Bluetooth™. For example, if a Bluetooth™ connection is established, the router 190 knows which address it is looking at and will be able to immediately route packets using the Bluetooth standard. Similarly, if the 802.11 connection is established, the router 190 uses this connection standard. In doing this operation, the router 190 pings its environment to decide on optimal transmission medium. If the signal reception is poor for both pathways, the router 190 can send some packets in parallel through both the primary and secondary communication channel (cellular and/or Bluetooth™) to make sure some of the packets arrive at their destinations. However, if the signal strength is adequate, the router 190 prefers the 802.11 and/or Bluetooth™ mode to minimize the number of subscribers using the capacity-limited and more expensive cellular system at any give time. Only a small percentage of the device 100, those that are temporarily outside the 802.11 and/or Bluetooth coverage, represents a potential load on the capacity of the cellular system, so that the number of mobile users can be many times greater than the capacity of the cellular system alone could support.

Figure 2B:
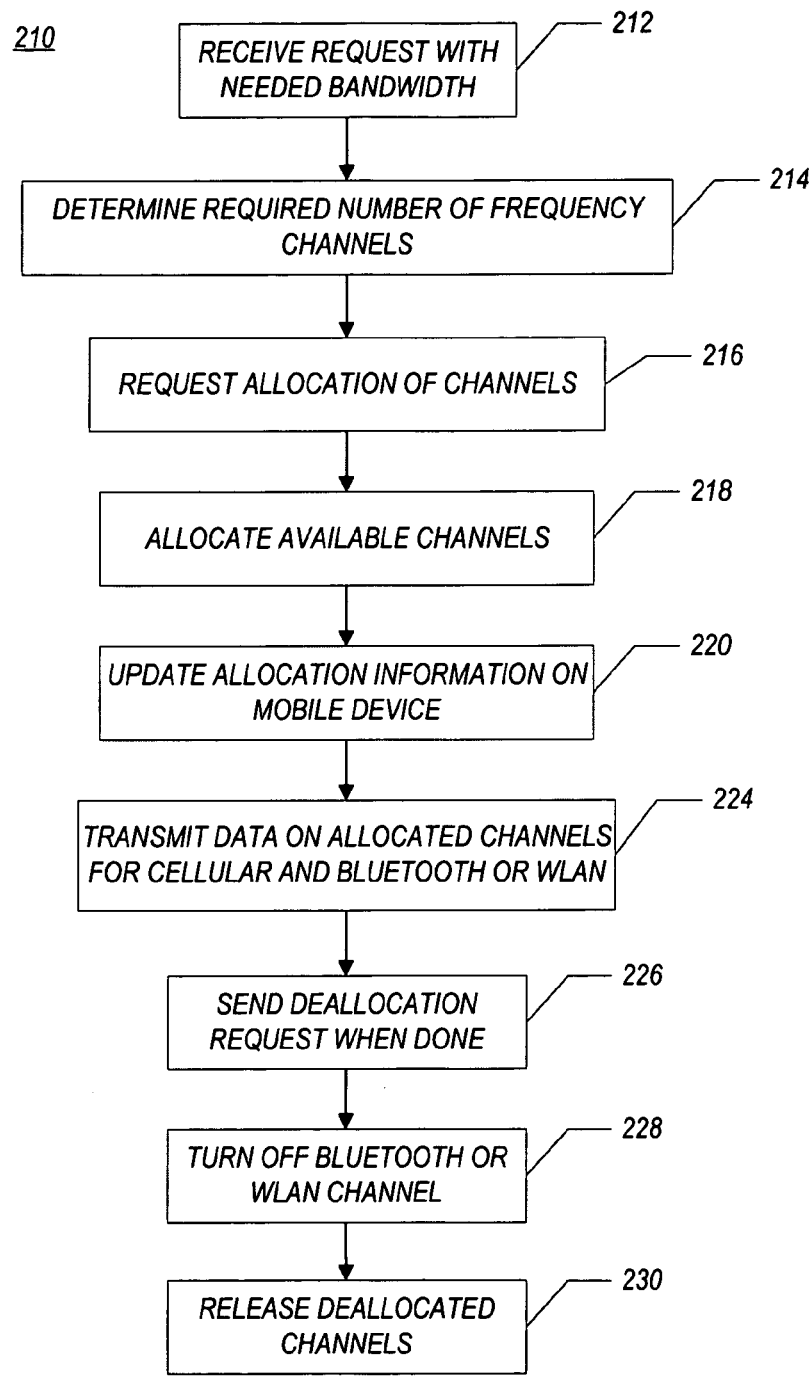
FIG. 2B shows an exemplary second process to bond cellular channels and 802.11 and Bluetooth channels together to further increase transmission speed for the system of FIG. 2A.
Figure 3:
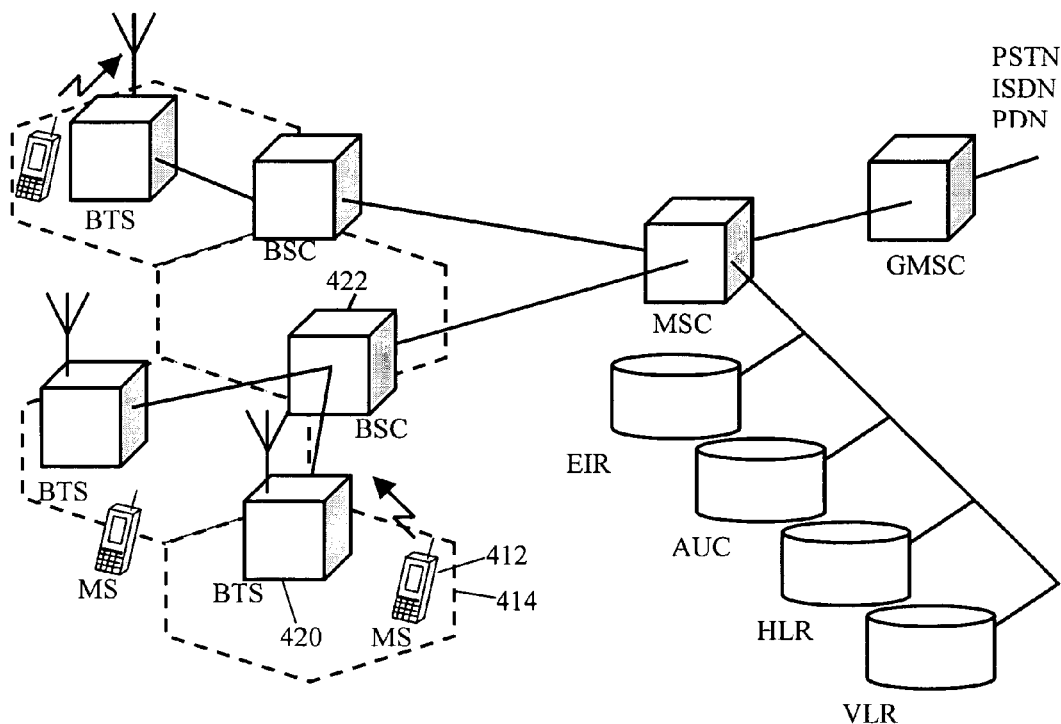
FIG. 3 is a block diagram of a wireless communication system.

FIG. 2B shows an exemplary second process to bond cellular channels and Bluetooth or WLAN channels together to further increase transmission speed for the system of FIG. 2A. The process receives a request to communicate one or more files with a data transmission size (step 212). Based on the transmission size and known cellular and Bluetooth or WLAN channel bandwidth, the process 210 computes the number of frequency channels that are needed (step 214). Next, the process 210 requests an allocation of cellular frequency channels from a mobile station to a base station (step 216). In response, the base station looks up available (open) frequency channels in its memory storage and allocates available frequency channels in response to the request from the mobile station (step 218). Information on the allocated channels is sent to the mobile station to set up its transceiver to capture data on all allocated channels (step 220). Once the mobile station sends an acknowledgement that it has set up its RF circuitry to receive data over a plurality of frequency channels, the base station can transmit data over the plurality of frequency channels and the Bluetooth or WLAN channel (step 224). In this manner, the allocated frequency channels are bonded together to communicate data with high bandwidth using a plurality of long-range and short-range wireless channels. Upon conclusion of data transmission, the mobile station sends a deallocation request to the base station (step 226), and turns off the Bluetooth or WLAN channel (step 228). The base station in turn releases the deallocated channels for other transmissions (step 230).

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. For example, although exemplary embodiments using Bluetooth, 802.11, GSM, GPRS, and EDGE are contemplated, the invention is applicable to other forms of data transmission, include radio-based and optical-based transmission techniques.

What is claimed is:

1. A method for securing a wireless communication medium using a Subscriber Identity Module (SIM) card, comprising:

determining a SIM card insertion and if so accessing SIM data and transmitting the SIM data to a base station for comparison with a local copy of an authorized user data file;

granting mobile unit access to the base station if the comparison is indicative of a match and otherwise indicating an access failure; and if the mobile unit access is grant, determining a desired level of service; and dynamically adjusting a number of time slots assigned to the wireless communication medium during data transmission to remain within limits of said desired level of service via the dynamically adjust number of time slots and at least one short-range wireless medium;

wherein the dynamic adjusting comprises:

determining available time-slot resources;

detecting the wireless communication medium that fails to meet said desired level of service;

allocating the wireless communication medium to a configuration having additional time slots; and transmitting a channel assignment message including information on the allocated configuration with the additional time slots.

2. The method of claim 1, wherein the at least one short-range wireless medium conforms to an 802.11 specification.

3. The method of claim 1, wherein the at least one short-range wireless medium conforms to a Bluetooth specification.

4. The method of claim 1, wherein the at least one short-range wireless medium operates at 2.4 gigahertz.

5. A system for securing a wireless communication medium using a Subscriber Identity Module (SIM) card, comprising:

means for determining a SIM card insertion and if so accessing SIM data and transmitting the SIM data to a base station for comparison with a local copy of an authorized user data file;

means for granting mobile unit access to the base station if the comparison is indicative of a match and otherwise indicating an access failure; and means for determining a desired level of service and dynamically adjusting a number of time slots assigned to the wireless communication medium during data transmission to remain within limits of said desired level of service via the dynamically adjust number of time slots and at least one short-range wireless medium if the mobile unit access is grant;

wherein the means for determining a desired level of service and dynamically adjusting comprises:

means for determining available time-slot resources;

means for detecting the wireless communication medium that fails to meet said desired level of service;

means for allocating the wireless communication medium to a configuration having additional time slots; and means for transmitting a channel assignment message including information on the allocated configuration with the additional time slots.

6. The system of claim 5, wherein at least one short-range wireless medium to an 802.11 specification.

7. The system of claim 5, wherein at least one short-range wireless medium to an bluetoooth specification.

8. The system of claim 5, wherein at least one short-range wireless medium operates 2.4 gigahertz.

* * * * *